C. ROTH.
VALVE GEAR FOR TURBINES.
APPLICATION FILED OCT. 18, 1906.
934,360.
Patented Sept. 14, 1909.
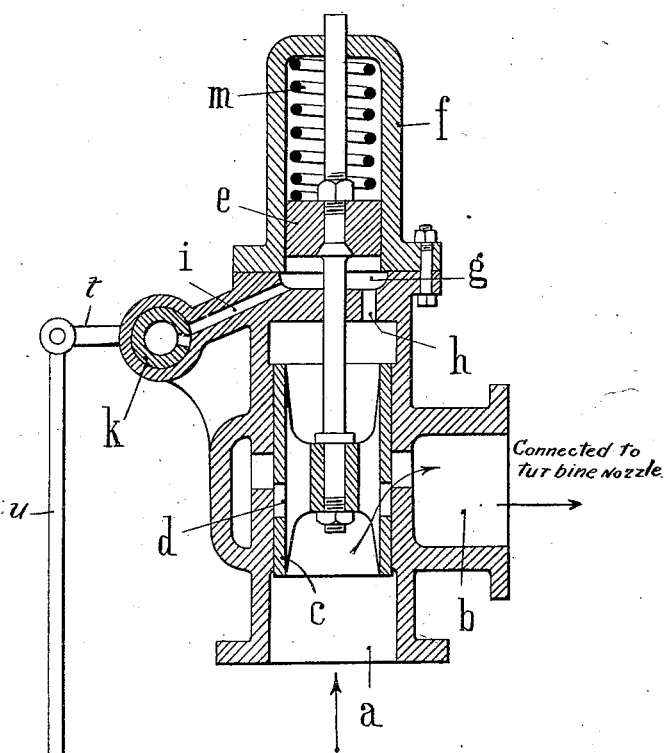
Fig. 1.
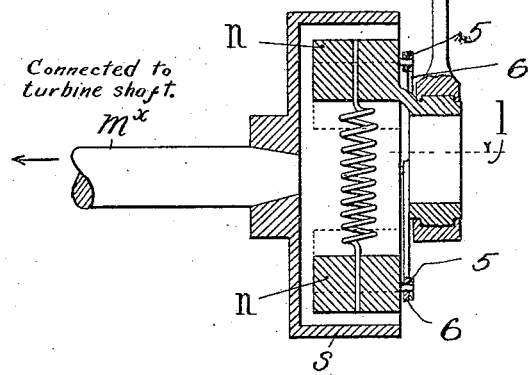
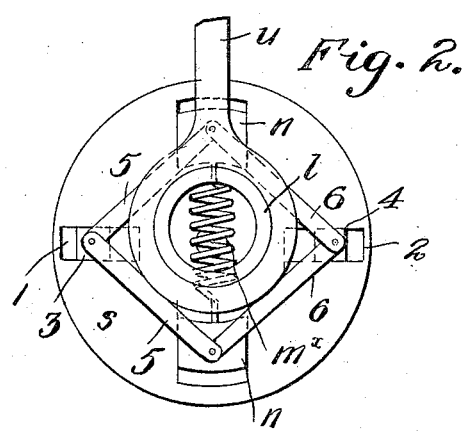

UNITED STATES PATENT OFFICE.

CARL ROTH, OF MUNICH, GERMANY, ASSIGNOR TO MELMS & PFENNINGER, G. M. B. H., OF MUNICH-HIRSCHAU, GERMANY, A COMPANY.

VALVE-GEAR FOR TURBINES.

934,360.  Specification of Letters Patent.  Patented Sept. 14, 1909.

Application filed October 18, 1906. Serial No. 339,578.

*To all whom it may concern:*

Be it known that I, CARL ROTH, engineer, a subject of Switzerland, and a resident of 94 Ismaningerstrasse, Munich, in the Kingdom of Bavaria, Germany, have invented a certain new and useful Improvement in Valve-Gear for Turbines and other Fluid-Pressure Engines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to valve gear for turbines and other fluid pressure engines, of the kind in which the pressure fluid is caused to be admitted to the engine in a pulsatory manner by means of a throttle valve having a reciprocatory or the like intermittent movement which is independent of the governor of the engine.

The invention has for its chief object to provide for the said throttle valve an auxiliary or supplementary control operated from the governor so that the movements of the valve, which are produced independently of the governor, will nevertheless be regulated thereby as regards their periods or their length of stroke according to the load.

In the drawings, Figure 1 is a diagrammatic, vertical section of the invention applied to a steam valve for a turbine; and Fig. 2 is an end view of a governor adapted for the purposes of my invention.

In the said drawing: $a$ is the live steam pipe, $b$ the inlet passage to the turbine, and $c$ the admission valve, through the ports $d$ of which the steam is admitted to the turbine. The admission valve is rigidly connected with the piston $e$ which can move to and fro in the cylinder $f$, under the influence of the spring $m$. The cylinder $f$ is connected with a pipe $a$ through the channel $h$, and with the atmosphere through the channel $i$. The channel $i$ can be partly or wholly shut off by means of a valve $k$. When it is completely shut off, the steam admission pressure is established in the chamber $g$ below the piston $e$, so that said piston, together with the admission valve $c$ rigidly connected therewith, is raised in opposition to the resistance of the spring $m$, and communication is established between the pipe or channels $a$ and $b$ by the ports $d$. If the valve $k$ only partially closes the channel $i$, part of the steam under the piston $e$ escapes from said channel $i$ and the spring $m$ causes the descent of the piston and also of the admission valve $c$, the result being that the ports $d$ are partially or entirely closed, as the case may be. The device as above described is of the well known type.

According to the present invention the regulating or control valve $k$ is connected as by means of a lever $t$ and a rod $u$ with an eccentric $l$ or the like driven directly or indirectly from the engine shaft in the present instance shown as driven through the governor shaft $m^x$ so that at each revolution of said shaft the regulation valve $k$ is turned through an angle dependent upon the throw of the eccentric which is governed by the sliding movement of the weights $n$, one of which carries the eccentric $l$. In the instance illustrated, the regulating valve consists of a cock containing a hollow bush or plug open to the atmosphere and to the channel $i$. The eccentric produces an oscillatory movement of the valve $k$ at all times, independently of the action of the governor $s$, and by this means fluctuations of pressure are effected under the piston $e$ and result in a continual opening and closing of the admission valve. The actual governing of the speed is effected by the rotating mass $n$ of the governor determining the throw or degree of eccentricity of the said eccentric in accordance with the load on the engine. The variation of the eccentricity causes the regulating valve $k$ to be opened to a greater or less extent, thus placing the chamber $g$ in communication with the atmosphere for a longer or shorter period of time, in consequence of which the admission valve is closed for a longer or shorter time at each stroke.

In Fig. 2, I have shown a conventional form of governor having a rotating support, provided with recesses or grooves 1 and 2, to receive sliding blocks 3 and 4. The blocks 3 and 4 are connected to the weights $n$, $n$ by links 5 and 6 in the usual manner, but as the blocks and links form no part of my invention, I have deemed it unnecessary to specifically describe their coöperate relation.

What I claim is:

1. In a governing mechanism for turbines, the combination of a main valve, an auxiliary valve varying the region of movement of the main valve, and means controlling the movement of the auxiliary valve and varying the amplitude of the movement of the auxiliary valve according to the load.

2. In a governing mechanism for turbines, the combination of a main valve, an auxiliary valve varying the region of movement of the main valve, and means controlling the movement of the auxiliary valve and varying the amplitude of the movement of the auxiliary valve according to the load; said means comprising an eccentric mounted to move and vary its degree of eccentricity according to the load.

3. In a governing mechanism for turbines, the combination of a main valve, an auxiliary valve varying the region of movement of the main valve, and means controlling the movement of the auxiliary valve and varying the amplitude of the movement of the auxiliary valve according to the load; said means comprising a movable eccentric, and means carrying the eccentric and mounted to move by centrifugal force to vary the degree of eccentricity of the eccentric according to the load.

4. In a governing mechanism for turbines, the combination of a main valve, an auxiliary valve varying the region of movement of the main valve, and means controlling the movement of the auxiliary valve and varying the amplitude of the movement of the auxiliary valve according to the load; said means comprising an eccentric, and a centrifugal governor connected to said eccentric and adapted to vary the degree of eccentricity of the eccentric according to the load.

In testimony, that I claim the foregoing as my invention, I have signed my name in presence of two subscribing witnesses.

CARL ROTH.

Witnesses:
 ABRAHAM SCHLESINGER,
 LOUIS F. MUELLER.